United States Patent
Fan et al.

(10) Patent No.: US 12,152,130 B2
(45) Date of Patent: Nov. 26, 2024

(54) WOOD ARTICLE AND PROCESS FOR THE PREPARATION OF THE WOOD ARTICLE

(71) Applicant: GUANGDONG HUARUN PAINTS CO., LTD, Foshan (CN)

(72) Inventors: Shigang Fan, Foshan (CN); Xi Zhao, Foshan (CN); Gang Duan, Cleveland, OH (US)

(73) Assignee: GUANGDONG HUARUN PAINTS CO., LTD, Foshan (CN)

( * ) Notice: Subject to any disclaimer, the term of this patent is extended or adjusted under 35 U.S.C. 154(b) by 645 days.

(21) Appl. No.: 17/424,331

(22) PCT Filed: Jan. 14, 2020

(86) PCT No.: PCT/CN2020/071956
§ 371 (c)(1),
(2) Date: Jul. 20, 2021

(87) PCT Pub. No.: WO2020/156144
PCT Pub. Date: Aug. 6, 2020

(65) Prior Publication Data
US 2022/0089839 A1 Mar. 24, 2022

(30) Foreign Application Priority Data

Jan. 29, 2019 (CN) .......................... 201910085603.9

(51) Int. Cl.
| | |
|---|---|
| *B05D 1/02* | (2006.01) |
| *B05D 3/02* | (2006.01) |
| *B27K 5/00* | (2006.01) |
| *B27M 1/00* | (2006.01) |
| *C08K 5/5419* | (2006.01) |
| *C09D 5/00* | (2006.01) |
| *C09D 131/06* | (2006.01) |
| *C09D 133/08* | (2006.01) |

(52) U.S. Cl.
CPC .............. *C08K 5/5419* (2013.01); *B05D 1/02* (2013.01); *B05D 3/0254* (2013.01); *B27K 5/001* (2013.01); *B27M 1/003* (2013.01); *C09D 5/002* (2013.01); *C09D 131/06* (2013.01); *C09D 133/08* (2013.01); *B05D 2203/20* (2013.01); *B05D 2518/10* (2013.01)

(58) Field of Classification Search
CPC .......... C08K 5/5419; B27K 5/00; B05D 3/02; B05D 1/02; C09D 5/00; C09D 133/08; C09D 131/06
USPC ....................................................... 524/261
See application file for complete search history.

(56) References Cited

U.S. PATENT DOCUMENTS 5,084,536 A   1/1992   Brindoepke et al.
5,565,525 A   10/1996  Morimoto et al.

FOREIGN PATENT DOCUMENTS

| CN | 1094740 | 11/1994 | |
|---|---|---|---|
| CN | 103974999 | 8/2014 | |
| CN | 107660228 | 2/2018 | |
| CN | 107667151 | 2/2018 | |
| CN | 108297221 | 7/2018 | |
| CN | 109909138 | 6/2019 | |
| EP | 0326723 | 8/1989 | |
| EP | 2556108 | 7/2014 | |
| EP | 2764035 | 12/2016 | |
| JP | 2011016858 | 1/2011 | |
| WO | 2014166880 | 10/2014 | |
| WO | WO-2018132545 A1 * | 7/2018 | ............... B05D 7/50 |
| WO | 2019004922 | 1/2019 | |

OTHER PUBLICATIONS

International Search Report & Written Opinion for patent appl. no. PCT/CN2020/071956, Apr. 2, 2020 (20 pages Including English Translation).
Brinkhuis, et al. "Taming the Michael Addition Reaction" European Coatings Journal, May 2015, 7 pages.
Sanchez-Morillo "Dynasylan Silanes in Coatings" Evonik Degussa Corp., Piscataway, NJ, 2007, 33 pages.
Office Action for Chinese patent application No. 201910085603.9, dated Nov. 16, 2021 (9 pages, including English summary of substantive portion of Office Action).
Office Action for Chinese patent application No. 201910085603.9, dated Feb. 2, 2021 (9 pages, including English summary of substantive portion of Office Action).
Office Action for Vietnamese patent application No. 1-2021-04705, dated Sep. 20, 2021 (2 pages including English translation).
Li, et al. "Tannins Dynamic of 15 Tropical Trees & Shrubs" https://wenku.baidu.com/view/0b1c684069eae009581bec1d.html, Last Accessed Jan. 14, 2022, 2 pages (English translation of abstract Included).
Extended European Search Report for European Patent Application No. 20749741.3 dated Oct. 25, 2022, 5 pages.
Allnex: "ACURE(TM) 510-170 technical datasheet", May 29, 2020 (May 29, 2020), pp. 1-1, XP055960587, Retrieved from the Internet: URL:https://allnex.com/en/product/4d98dd0d-7f25-4196-a92f-9f9605ab6496/acure-510-1701 [retrieved on Sep. 13, 2022].

* cited by examiner

*Primary Examiner* — Deve V Hall

(57) ABSTRACT

The present disclosure relates to a wood article and a process for preparing the wood article. In particular, the present disclosure relates to a wood article comprising a wood substrate comprising acidic substances and having at least one major surface; an adhesion promoting layer directly applied on the major surface of the wood substrate; and a Michael Addition curing coating applied on the adhesion promoting layer, wherein the adhesion promoting layer is formed by a composition comprising a functional silane comprising amino and/or imino functional groups; and wherein the Michael Addition curing coating is formed from a two-component curable coating composition.

18 Claims, 1 Drawing Sheet

WOOD ARTICLE AND PROCESS FOR THE PREPARATION OF THE WOOD ARTICLE

CROSS-REFERENCE TO RELATED APPLICATIONS

The present application is the National Stage filing under 35 U.S.C. 371 of International Application No. PCT/CN2020/071956 filed Jan. 14, 2020, which claims priority to Chinese Patent Application No. 201910085603.9 entitled "wood article and process for the preparation of the wood article" and filed on Jan. 29, 2019, which is incorporated herein by reference in its entirety.

TECHNICAL FIELD

The present disclosure relates to a wood article containing a Michael Addition curing coating. More specifically, the present disclosure relates to the use of a functional silane comprising amino and/or imino functional groups as an adhesion promoting layer for improving the adhesion of the Michael Addition curing coating to a wood substrate comprising acidic substances, and to the resulting wood articles having a Michael Addition curing coating assisted by the adhesion promoting layer.

BACKGROUND

Wooden articles including wood furniture, which are the most commonly used product in production and life, are mainly made of wood substrates. It is well known that wood substrates have special textures, natural color and the like that are unmatched by other materials. However, the wooden substrate inevitably has the characteristics of complex structure, uneven material, porous, swelling and shrinking when exposed to water, and containing undesirable substances such as grease, tannins and other colored impurities, which is not an ideal industrial material. Therefore, the research on wood lacquers that can provide a protective layer for wooden substrates has attracted particular attention.

The Michael addition curing coating system with low volatile organic compounds (VOC) has received special attention in recent years, which is expected to replace two-component polyurethane (PU) curing coatings in the fields of ships, aerospace, construction, and metal profiles. Particularly attractive is that this coating system has many attractive advantages, including: (1) capable of curing at ambient temperatures, even lower temperature; (2) very low solvent content such as VOC<250 g/l; (3) very long pot-life such as a pot life of >8 hours at 23° C.; (4) excellent appearance such as gloss @ 60° of >90 and DOI>90; (5) excellent mechanical properties (including excellent chemical resistance, excellent scratch resistance, excellent flexibility, good outdoor resistance, and the like), and (6) free of harmful chemicals such as isocyanate, formaldehyde and organtin and the like. Thus, there has been a strong demand for this Michael Addition curing system in market. However, the application of this system on wood substrates is not satisfactory. So far, there is no wood article coated with this low-VOC Michael addition curing coating system on the market.

Therefore, there is a need in industry for wood articles coated with this low-VOC Michael addition curing coating system.

SUMMARY

In one aspect, the present disclosure discloses a wood article, comprising i) a wood substrate comprising acidic substances and having at least one major surface; ii) an adhesion promoting layer directly applied on the major surface of the wood substrate; and iii) a Michael Addition curing coating applied on the adhesion promoting layer, wherein the adhesion promoting layer is formed by a composition comprising a functional silane comprising amino and/or imino functional groups; and wherein the Michael Addition curing coating is formed from a two-component curable coating composition. Preferably, the wood article has an adhesion of 5B or more, as measured with a cross-hatch method according to ASTM D3359.

In another aspect, the present disclosure provides a process for preparing the wood article as above, comprising (a) providing a wood substrate comprising acidic substances and having at least one major surface; (b) directly applying the composition comprising functional silane on the major surface of the wood substrate to form an adhesion promoting layer; and (c) applying the two-component curable coating composition on the adhesion promoting layer, to form a Michael Addition curing coating.

In yet another aspect, the present disclosure discloses a method for improving adhesion of a Michael Addition curing coating to a wood substrate comprising acidic substances, comprising the step of directly applying an adhesion promoting layer on the major surface of the wood substrate wherein the adhesion promoting layer is formed by a composition comprising a functional silane comprising amino and/or imino functional groups; and wherein the Michael Addition curing coating is formed from a two-component curable coating composition comprising A) a film-forming resin composition, comprising a) a first reactive component having at least two acidic proton C—H in activated methylene or methine, b) a second component having at least two active unsaturated C=C group, and c) optionally additional additives comprising one or more selected from fillers, solvents, surface active additives, defoamers, dispersants, UV absorbers, open-time extenders, preservatives and fungicides; and B) a catalyst for catalyzing the Michael Addition reaction of the film-forming resin composition.

In still yet another aspect, the present disclosure discloses use of an adhesion promoting layer for improving adhesion of a Michael Addition curing coating to a wood substrate comprising acidic substances, wherein the adhesion promoting layer is formed by a composition comprising a functional silane comprising amino and/or imino functional groups; and wherein the Michael Addition curing coating is formed from a two-component curable coating composition comprising A) a film-forming resin composition, comprising a) a first reactive component having at least two acidic proton C—H in activated methylene or methine, b) a second component having at least two active unsaturated C=C group, and c) optionally additional additives comprising one or more selected from fillers, solvents, surface active additives, defoamers, dispersants, UV absorbers, open-time extenders, preservatives and fungicides; and B) a catalyst for catalyzing the Michael Addition reaction of the film-forming resin composition.

In one embodiment of the present disclosure, the functional silane has the structure represented by the following general formula (I)

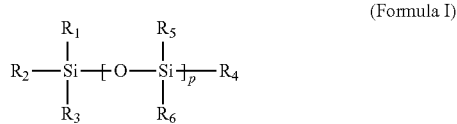

(Formula I)

in which
R$_1$, R$_2$ and R$_3$ each represents independently C$_1$-C$_6$ alkyloxy, C$_2$-C$_6$ alkenyloxy, C$_6$-C$_{10}$ aryloxy, C$_1$-C$_6$ alkanoyloxy, C$_6$-C$_{10}$ arylacyloxy, C$_1$-C$_6$ alkyl ketoximine or C$_6$-C$_{10}$ aryl ketoximine, with R$_1$, R$_2$ and R$_3$ being the same or different;
R$_4$ represents un-substituted or N-substituted amino C$_1$-C$_6$ alkyl with substituents being one or more selected from the group consisting of amino C$_1$-C$_6$ alkyl, C$_1$-C$_6$ alkyl, C$_6$-C$_{10}$ aryl, C$_7$-C$_{14}$ alkaryl and C$_7$-C$_{14}$ aralkyl;
R$_5$ and R$_6$ each represents independently C$_1$-C$_6$ alkyl, C$_6$-C$_{10}$ aryl, C$_7$-C$_{14}$ alkaryl or C$_7$-C$_{14}$ aralkyl; and
p is an integer of 0 to 4, preferably 0.

In another embodiment of the present disclosure, the functional silane further comprises one or more silanol groups chemically bonded to the molecular backbone of the functional silane. As an illustrated example, the functional silane has the following structure represented by the following general formula (II)

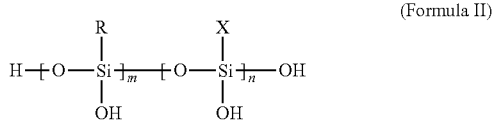

(Formula II)

in which
R represents independently, at each occurrence, optionally substituted C1-C20 alkyl, optionally substituted C6-C10 aryl, or un-substituted or N-substituted amino C$_1$-C$_6$ alkyl;
X represents independently, at each occurrence, X represents independently, at each occurrence, un-substituted or N-substituted amino C$_1$-C$_6$ alkyl;
m is an integer of greater than or equal to 1 and less than 50,
n is an integer of greater than or equal to 1 and less than 50, and
the sum of m and n is an integer of greater than or equal to 2.

In the present disclosure, the applicant proposed an inventive new idea for the application of a Michael addition curing coating on wood substrates containing acidic substances by applying a composition containing amino and/or imino functional silanes directly on the surface of the wood substrates containing acidic substances as an adhesion promoting layer. The presence of the adhesion promoting layer significantly reduces or eliminates the adverse effects of acidic substances such as tannin in the wood substrate on the Michael Addition curing coating, which has never been recognized prior to the present disclosure.

The details of one or more embodiments of the present disclosure are set forth in the description below. Other features, objects, and advantages of the present disclosure will be apparent from the description, and from the claims Definition As used herein, "a", "an", "the", "at least one", and "one or more" are used interchangeably. Thus, for example, a composition that comprises "an" additive can be interpreted to mean that the composition includes "one or more" additives.

Throughout the present disclosure, where compositions are described as having, including, or comprising specific components or fractions, or where processes are described as having, including, or comprising specific process steps, it is contemplated that the compositions or processes as disclosed herein may further comprise other components or fractions or steps, whether or not, specifically mentioned in this invention, as along as such components or steps do not affect the basic and novel characteristics of the present disclosure, but it is also contemplated that the compositions or processes may consist essentially of, or consist of, the recited components or steps.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

When used in the context of wood substrates, the term "major surface" is a surface defined by the lengthwise and widthwise dimensions of the wood substrates for providing the decoration.

As used herein, the term "adhesion promoting layer" is formed of a composition containing a functional silane, which may be continuous or discontinuous in the microscopic view, depending on the functional silane as used. In an embodiment in which an amino and/or imino-functional silane having a smaller molecular weight is used to form an adhesion promoting layer, the resulting adhesion promoting layer would be discontinuous. In an embodiment in which an amino and/or imino-functional silane having a higher molecular weight is used to form an adhesion promoting layer, the resulting adhesion promoting layer is continuous.

As used herein, the term "adhesion" is a parameter used to measure whether a Michael addition curing coating can form an acceptable coating on a wood substrate. The higher the adhesion, the better the film-forming stability of the Michael Addition curing coating on the wood substrate is.

The term "on" when used in the context of "a Michael addition curing coating applied on an adhesion promoting layer" includes the curing coating being applied directly or indirectly on the adhesion promoting layer. In some embodiments of the present disclosure, the Michael addition curing coating is applied directly to the adhesion promoting layer and is in direct contact with the adhesion promoting layer. In some embodiments of the present disclosure, one or more layers of colorant may be present between the Michael addition curing coating and the adhesion promoting layer so as to achieve the desired color.

The term "comprises", "comprising", "contains" and variations thereof do not have a limiting meaning where these terms appear in the description and claims.

The terms "preferred" and "preferably" refer to embodiments of the present disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the present disclosure.

DETAILED DESCRIPTION

Figure 1A:
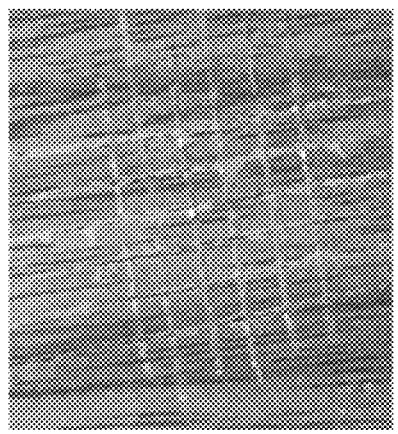
In FIG. 1A, the Michael addition curing coating has a thickness of 30 microns.
Figure 1A:
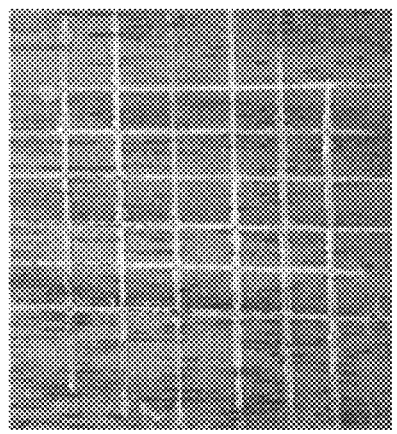
Figure 1B:
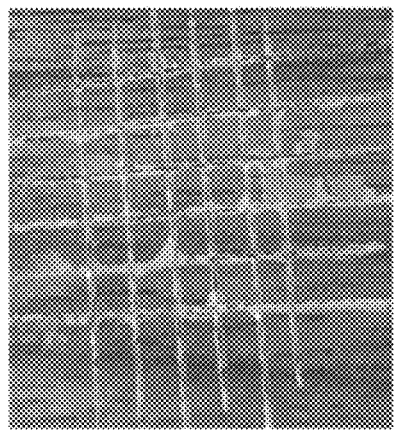
in FIG. 1B, the Michael Addition curing coating has a thickness of 100 microns; and in FIG. 1C, the Michael addition curing coating has a thickness of 200 microns.
Figure 1B:
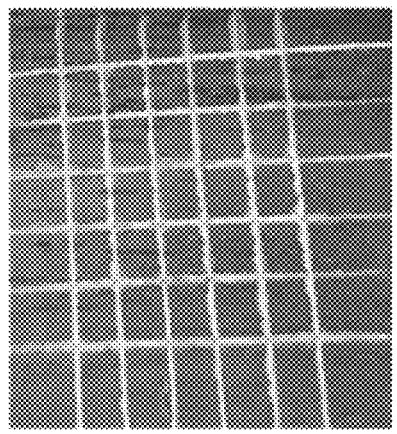
Figure 1C:
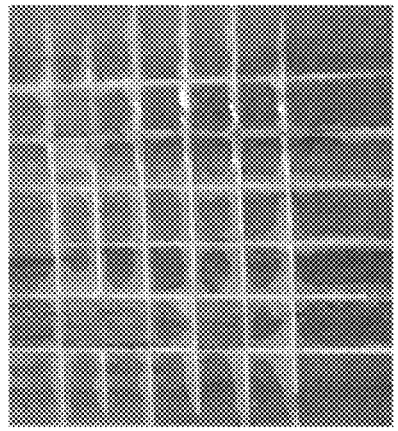
FIG. 1 shows the cross-hatch adhesion test results of a wooden substrate coated with a Michael Addition curing coating prepared according to Example 1 of the present disclosure, wherein the result on the upper column is obtained from the wooden substrate without a silane adhesion promoting layer, and the result on the bottom column is obtained from the wooden substrate with a silane adhesion promoting layer.
Figure 1C:
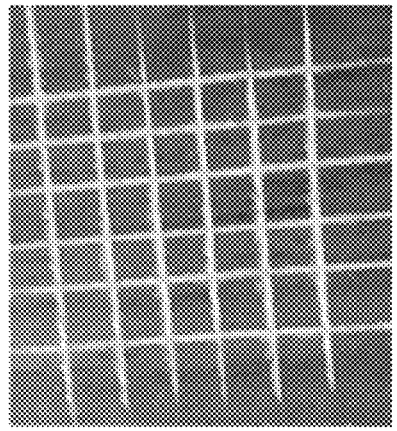

The present embodiments in one aspect provide a wood article comprising i) a wood substrate comprising acidic substances and having at least one major surface; ii) an adhesion promoting layer directly applied on the major surface of the wood substrate; and iii) a Michael Addition curing coating applied on the adhesion promoting layer, wherein the adhesion promoting layer is formed by a composition comprising a functional silane comprising amino and/or imino functional groups; and wherein the Michael Addition curing coating is formed from a two-component curable coating composition.

Preferably, the wood article according to the present disclosure has an adhesion of 5B or more, as measured with a cross-hatch method according to ASTM D3359. In an embodiment in which the Michael addition curing coating of the present disclosure has a thickness of 30 microns or more, the wood product has an adhesion of 5B or higher. In an embodiment in which the thickness of the Michael addition curing coating of the present disclosure is 100 micrometers or more, the wood product has an adhesion of 5B or higher. In an embodiment in which the thickness of the Michael addition curing coating of the present disclosure is 200 micrometers or more, the wood product has an adhesion of 5B or higher.

Wood Substrate

As the wood substrate used to make the article of the present disclosure, any suitable wood substrate known in the art can be used. In the present disclosure, the term "wood substrate" refers to any cellulose/lignin material derived from the hard, fibrous structural organization of the stems and roots of trees or other woody plants. Wood includes, for example, hardwood and softwood wood cut directly from trees, and engineered wood composite materials made of wood strips, wood chips, wood fibers, or wood veneers. Examples of wood composite materials include, but are not limited to, plywood, oriented strand board (OSB), medium density fiberboard (MDF), particle board, and the like.

The wood article of the present disclosure comprises a wood substrate comprising acidic substances. As an example, the acidic substances include tannins, aldehydes and/or hemiacetals. In some embodiments of the present disclosure, the wood substrate has a tannin content of at least 0.1% by weight, preferably a tannin content of at least 1% by weight, more preferably a tannin content of at least 5% by weight, and even more preferably a tannin content of at least 10% by weight, even more preferably a tannin content of 30% by weight, as determined by CNS4716-2005. As exemplary wood substrates, hardwood, chestnut, *eucalyptus*, red chestnut, *camellia, eucalyptus*, Douglas fir, Japanese cedar, American cypress, Japanese red pine, Japanese cypress, water walnut, black walnut, maple, Japan beech, Japanese *Paulownia*, birch, *Borneo, magnolia*, ash, teak, Xylosma *japonicum, Catalpa* wood, *Dryobalanops* spp., fir, oak and rubber wood may be given.

According to the present disclosure, the wood substrate has at least one, preferably two, major surfaces that are opposite one another. As used herein, "major surface" is a surface defined by the lengthwise and widthwise dimensions of the wood substrate for providing the decoration. Preferably, the major surface of the wood substrate may contain polar groups such as hydroxyl groups, amino groups, mercapto groups, and the like, so that when a composition comprising a functional silane according to the present disclosure is applied thereon, the alkoxy or hydroxyl group attached to the silicon atom of the functional silane can undergo a bonding reaction with the hydroxyl group on the surface of the wooden substrate, thereby forming an adhesion promoting layer. The hydroxyl groups on the surface of the wood substrate are derived from cellulose in the wood substrate, or are introduced on the surface of the wood substrate by performing surface treatment on the major surface of the wood substrate, for example, by corona treatment.

Adhesion Promoting Layer

According to the wood article of the present disclosure, the adhesion promoting layer is formed directly on the main surface of the wood substrate and is formed of a composition containing amino and/or imino functional silane.

In an embodiment of the present disclosure, the functional silane has the structure represented by the following general formula (I)

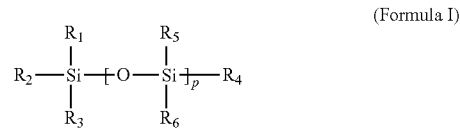

(Formula I)

in which, $R_1$, $R_2$ and $R_3$ each represents independently $C_1$-$C_6$ alkyloxy, $C_2$-$C_6$ alkenyloxy, $C_6$-$C_{10}$ aryloxy, $C_1$-$C_6$ alkanoyloxy, $C_6$-$C_{10}$ arylacyloxy, $C_1$-$C_6$ alkyl ketoximine or $C_6$-$C_{10}$ aryl ketoximine, with $R_1$, $R_2$ and $R_3$ being the same or different; $R_4$ represents un-substituted or N-substituted amino $C_1$-$C_6$ alkyl with substituents being one or more selected from the group consisting of amino $C_1$-$C_6$ alkyl, $C_1$-$C_6$ alkyl, $C_6$-$C_{10}$ aryl, $C_7$-$C_{14}$ alkaryl and $C_7$-$C_{14}$ aralkyl; $R_5$ and $R_6$ each represents independently $C_1$-$C_6$ alkyl, $C_6$-$C_{10}$ aryl, $C_7$-$C_{14}$ alkaryl or $C_7$-$C_{14}$ aralkyl; and p is an integer of 0 to 4, preferably 0.

Preferably, the functional silane having the above structure comprises one or more selected from amino C1-C6 alkyl trimethoxy silane, amino C1-C6 alkyl triethoxy silane, amino C1-C6 alkyl tripropoxy silane, amino C1-C6 alkyl tributyloxy silane, amino C1-C6 alkyl triisopropenyloxy silane, amino C1-C6 alkyl tributyl ketoximine silane, N-(amino C1-C6 alkyl)-amino C1-C6 alkyl trimethoxy silane, N-(amino C1-C6 alkyl)-amino C1-C6 alkyl triethoxy silane, N-(amino C1-C6 alkyl)-amino C1-C6 alkyl tripropoxy silane, N-(amino C1-C6 alkyl)-amino C1-C6 alkyl tributyloxy silane, N-(amino C1-C6 alkyl)-amino C1-C6 alkyl triisopropenyloxy silane, and N-(amino C1-C6 alkyl)-amino C1-C6 alkyl tributyl ketoximine silane. More preferably, the functional silane having the above structure comprises one or more selected from aminopropyl trimethoxysilane, aminopropyl triethoxysilane, N-aminoethyl-aminopropyl trimethoxysilane, N-aminoethyl-aminopropyl triethoxysilane, anilinomethyl triethoxysilane and anilinomethyl trimethoxysilane.

The linkage between the above-mentioned functional silane and the hydroxyl group on the surface of the wood substrate is achieved by a pair of complementary reactive linking groups comprising the condensable functional groups in the functional silane, such as alkoxy, alkenyloxy, aryloxy, alkanoyloxy, aroyloxy, alkyl ketoximine and aryl ketoximine and the hydroxyl groups present on the surface of the wood substrate. Such a pair of complementary reactive linking groups undergo coupling through condensation, and release small molecular substances, such as alcohols, esters, ketoximes, and the like, thereby forming an adhesion promoting layer on the surface of the wood substrate. More importantly, the inventors of the present disclosure surprisingly discovered that the amino groups (—NH2) and/or imino groups (—NH—) in the above-mentioned functional silane can react with the acidic substances contained in the wood substrate and then reduce or eliminate the acidity of the wood surface, which is conducive to the alkali-catalyzed Michael addition curing reaction, and improves the adhesion of the Michael addition curing coating to the wood substrate.

Since the distribution of hydroxyl groups on the surface of the wooden substrate is non-uniform, and the functional silane is of low molecular weight, the adhesion promoting layer formed therefrom may be microscopically discontinuous. Even so, the adhesion promoting layer according to the present disclosure still exhibit a very beneficial adhesion promoting effect, which can significantly improve the adhesion of the Michael addition curing coating to the wood substrate containing acidic substances.

In one embodiment of the present disclosure, the composition containing the above mentioned functional silane is in the form of a system in an organic solvent. In the present disclosure, the organic solvent system comprising the functional silane refers to a system in which the functional silane is dissolved in organic solvents including alcohols, ketones, ester solvents or a combination thereof, preferably in acetone. As an example of the functional silane, any suitable commercially available products can be used, such as amino silane from Momentive, such as A-1100, A-1102, A-1106, A-1110, A-1120, A-1128, A-1130, A-1170/Y-9627, A-1387, A-1637, A-2120, A-2639, Y-9669, and A-15.

In another embodiment of the present disclosure, the composition containing the above mentioned functional silane is in the form of an aqueous dispersion. In the present disclosure, the aqueous dispersion of the functional silane refers to a composition in which the functional silane is dispersed in an aqueous solvent including water, a water miscible solvent, or a combination thereof, preferably in water, which does not contain volatile organic components.

According to one embodiment of the present disclosure, the functional silane in the form of an aqueous dispersion refers to a polymer comprising a —Si—O— structural unit in the molecular skeleton thereof, i.e. siloxane, which polymer comprises one or more amine and imine groups and one or more hydrophobic groups chemically bonded to the molecular skeleton thereof and may further comprise one or more silanol groups.

According to the present disclosure, "hydrophobic group" refers to an atom or group of atoms that is almost neither of water-affinity nor of water-solubility. Common hydrophobic groups include, but are not limited to, $C_1$-$C_{20}$ hydrocarbyls, including alkyl or aryl groups. In an embodiment of the present disclosure, the hydrophobic group includes a $C_1$-$C_{20}$ alkyl group or a $C_6$-$C_{10}$ aryl group. As examples of hydrophobic groups, methyl, ethyl, propyl, butyl, pentyl, hexyl, heptyl, octyl, nonyl, decyl, undecyl, dodecyl, tridecyl, tetradecyl, pentadecyl, hexadecyl, octadecyl, and eicosyl groups, preferably substituted by halogen, more preferably by fluorine may be given. Optionally, one or more of the hydrophobic groups may also be one or more groups selected from unsubstituted or N-substituted amino C1-C6 alkyl groups.

According to the present disclosure, "silanol group" refers to a functional group having a —Si—OH structure. The presence of such a group allows the functional silane to crosslink themselves or react with other active functional groups such as hydroxyl groups and the like. In an embodiment of the present disclosure, the silanol group on the functional silane can react with hydroxyl functional groups on the wood substrate to form an adhesion promoting layer Preferably, the aqueous dispersions suitable for use in the present disclosure have a lower viscosity. In one embodiment of the present disclosure, the aqueous dispersion has a viscosity of 50 mPa·s or less at 25° C., preferably has a viscosity of 30 mPa·s or less at 25° C., and more preferably has a viscosity of 20 mPa·s or less at 25° C., still more preferably has a viscosity of 10 mPa·s or less at 25° C. and the most preferably has a viscosity of 5 mPa·s or less at 25° C. It has been observed that the aqueous dispersion with a lower viscosity can more easily penetrate into the pores and textures of the wood substrate thereby forming a substantially integral adhesion promoting layer on the surface of the wood substrate.

Preferably, the aqueous dispersion suitable for use in the present disclosure has a relatively high pH. In one embodiment of the present disclosure, the aqueous dispersion has a pH of 10 or higher at 20° C., preferably a pH of 10.5 or higher at 20° C., and more preferably a pH of 11 or higher at 20° C. It has been observed that the adhesion promoting layer formed from the aqueous dispersion containing a functional silane with a pH in the above range will not adversely affect the formation of the Michael addition curing coating thereon.

In an embodiment of the present disclosure, the functional silane having amino and/or imino groups may have the following structure (Formula II):

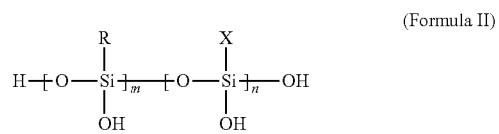

(Formula II)

in which

R represents independently, at each occurrence, optionally substituted C1-C20 alkyl, optionally substituted C6-C10 aryl, or un-substituted or N-substituted amino $C_1$-$C_6$ alkyl;

X represents independently, at each occurrence, un-substituted or N-substituted amino $C_1$-$C_6$ alkyl;

m is an integer of greater than or equal to 1 and less than 50, n is an integer of greater than or equal to 1 and less than 50, and the sum of m and n is an integer of greater than or equal to 2.

Preferably, R represents independently at each occurrence methyl, ethyl, propyl, butyl, pentyl, hexyl, heptyl, octyl, nonyl, decyl, undecyl, dodecyl, tridecyl, tetradecyl, pentadecyl, hexadecyl, octadecyl, eicosyl, amino $C_1$-$C_6$ alkyl or N-(amino $C_1$-$C_6$ alkyl)-amino $C_1$-$C_6$ alkyl. Preferably, X represents independently at each occurrence amino $C_1$-$C_6$ alkyl or N-(amino $C_1$-$C_6$ alkyl)-amino $C_1$-$C_6$ alkyl.

Preferably, the functional silane comprises a mixture of siloxane molecules of Formula II, and the mixture has a ratio of m to n in the range of 0.8:1 to 1.2:1, preferably a ratio of m to n in the range of 0.9:1 to 1.1:1, even more preferably a ratio of m to n in the range of 0.95:1 to 1.05:1, even more preferably a ratio of m to n in the range of 0.98:1 to 1.02:1. It has been observed that siloxane having the above ratio of m to n has beneficial dispersion stability, and an aqueous dispersion containing such a silane can achieve a particularly beneficial film-forming effect when it is applied on a wood substrate.

The aqueous dispersions of functional silane can be prepared using suitable methods well known to those skilled in the art, for example by condensation of silane compounds by the gel-sol method. Alternatively, any suitable commercially available product can be used, such as Siloxane dispersions from Evonik of Germany such as Dynasylan® Hydrosil 2627, Hydrosil 2776, Hydrosil 2909, SIVO 112.

According to the present disclosure, the functional silane can be applied by customary application processes known to a person skilled in the art. The application processes comprise dip coating, spin coating, spray coating, curtain coating, brush coating, roll coating, and other coating methods known in the art. In one embodiment of the present disclosure, application is carried out by spray coating.

Michael Addition Curing Coating

In the wood article according to the present disclosure, a Michael addition curing coating may be formed on the surface of the wood substrate having the adhesion promoting layer. The Michael addition curing coating can be directly applied to the adhesion promoting layer and in direct contact with the adhesion promoting layer. Alternatively, there may be one or more other coatings, such as a colorant layer, between the Michael addition curing coating and the adhesion promoting layer, so as to obtain the desired color.

The Michael addition curing coating thus formed shows very excellent adhesion to the wood substrate. Preferably, the wood article according to the present disclosure has an adhesion of 5B or more, as measured with a cross-hatch method according to ASTM D3359. In an embodiment in which the Michael addition curing coating of the present disclosure has a thickness of 30 microns or more, the wood product has an adhesion of 5B or higher. In an embodiment in which the thickness of the Michael addition curing coating of the present disclosure is 100 micrometers or more, the wood product has an adhesion of 5B or higher. In an embodiment in which the thickness of the Michael addition curing coating of the present disclosure is 200 micrometers or more, the wood product has an adhesion of 5B or higher.

According to the present disclosure, the Michael Addition curing coating is formed from a two-component curable coating composition. In one embodiment of the present disclosure, the two-component curable coating composition comprises, A) a film-forming resin composition, comprising a) a first reactive component having at least two acid proton C—H in activated methylene or methine, b) a second component having at least two active unsaturated C═C group, and c) optionally additional additives comprising one or more selected from fillers, solvents, surface active additives, defoamers, dispersants, UV absorbers, open-time extenders, preservatives and fungicides; and B) a catalyst for catalyzing the Michael Addition reaction of the film-forming resin composition.

The film-forming resin composition, the catalyst and the preparation process of the Michael addition curing coating are described in detail in U.S. Pat. Nos. 5,084,536, 5,565,525, EP2556108 and EP2764035. Unless otherwise stated, the contents described in the above patent applications are incorporated herein by reference and are applicable herein.

According to an embodiment of the present disclosure, the first reactive component has a malonate or acetoacetate functional group and preferably has a malonate functional group as a first reactive functional group. Preferably, the first reactive component mainly contains one kind of first reactive functional group, preferably greater than 50, 75, 90 and most preferably 100% of the first reactive functional group is one kind of first reactive functional group, preferably malonate or acetoacetate, most preferably malonate. According to the present disclosure, the second reactive component has an acryl group as a second reactive functional group.

The first reactive functional group and the second reactive functional group in the first reactive component and the second reactive component are preferably incorporated into the backbone of polymer or suspended on the pendent chain or terminal of polymer. Preferably, the first reactive component and the second reactive component are polyester, alkyd, polyurethane, polyacrylate, epoxy resin, polyamide and polyvinyl resin having a first reactive functional group and a second reactive functional group in its backbone, pendent chain, terminal or a combination thereof, respectively.

The first reactive component and the second reactive component may be monomeric, but at least one, preferably at least two reactive components are polymers having a weight average molecular weight (Mw) of at least 250 g/mol, preferably polymers having a weight average molecular weight (Mw) between 250 and 5000 or 300 and 5000, more preferably between 400 and 4000 or between 500 and 3000 g/mol, the weight average molecular weight being measured by GPC.

The relative amounts of the first reactive component and the second reactive component are selected so that the molar ratio of the activated unsaturated reactive group C═C in the second reactive component to the activated acidic reactive group C—H in the first reactive component is between 0.5 and 2, and preferably between 0.75 and 1.5, more preferably between 0.8 and 1.2.

The first reactive component and the second reactive component are both commercially available, for example Acure 510-170 commercially available from Allnex resin with a solid content of 85% as the first reactive component, and Acure 550-100 commercially available from Allnex resin with a solid content of 85% as the second reactive component.

The film-forming resin composition according to the present disclosure may optionally comprise one or more fillers. As used herein, the term, "filler", is intended to refer to any coating volume extender, either organic or inorganic, in the form of e.g., particles or powders. There is no particular limitation on the shape of particles, and the filler may have any suitable shape. The particle size of the filler may vary over a broad range, e.g., from about 10 nanometers to about 50 micrometers. In addition to serving as a coating volume extender, some fillers may impart one or more desired properties to the composition and/or coating resulted from the composition. For example, some fillers may impart desired color to the composition and hence the coating resulted from the composition, and in this case such fillers may be also referred to as "pigment". Some fillers may improve chemical and/or physical properties, in particular mechanical properties of the coating resulted from the composition, and in this case they may also be referred to as "enforcing additive".

The film-forming resin composition according to the present disclosure may optionally include additional additives for a coating composition which do not adversely affect the coating composition or a resultant coating obtained therefrom. Suitable additives include, for example, those that improve the processability or manufacturability of the composition, enhance composition aesthetics, or improve a particular functional property or characteristic of the coating composition or the cured composition resulting therefrom, such as adhesion to a substrate. Additives that may be included are, for example, one or more selected from solvents, surface active additives, defoamers, dispersants, UV absorbers, open-time extenders, preservatives and fungicides. Each optional ingredient can be included in a sufficient amount to serve its intended purpose, but preferably not in such an amount to adversely affect the coating composition or the cured coating resulting therefrom.

In the two-component curable coating composition according to the present disclosure, the catalyst may be a non-latent catalyst or a latent catalyst. Among them, the latent catalyst may be a carbon dioxide-blocked strong base catalyst, preferably a dialkyl or quaternary ammonium alkyl carbonate as described in EP2556108. Since the catalyst generates carbon dioxide, it is preferably used in coatings with a thickness of 500, 400, 300, 200, or 150 microns.

EP0326723 describes a homogeneous base catalyst that is more suitable for thicker coatings, which is a catalyst composed of a combination of tertiary amine and epoxide. A preferred homogeneous catalyst is a salt of a basic anion X— from an acidic X—H group containing compound wherein X is N, P, O, S or C, in which the anion X— is a Michael Addition donor reactable with a second reactive component and the anion X— is characterized by a pKa of the corresponding acid X—H of more than two units lower than the pKa of the majority first active component and being lower than 10.5. The details of the catalyst are described in PCT/EP2014/056953, which is incorporated herein by reference.

Preferably, according to the present disclosure, the weight ratio of the catalyst to the film-forming resin composition can be varied in the range of 2:100 to 8:100. Generally speaking, in the event that the weight ratio of the catalyst to the film-forming resin composition is less than 2:100, the resulting coating has a poor curing performance. While in the event that the weight ratio of the catalyst to the film-forming resin composition is greater than 8:100, the operating performance of the resulting Michael addition curing coating and/or the mechanical properties of the resulting coating may be reduced. According to actual needs, an additional inert diluent can be added during the preparation of the catalyst and/or film-forming resin composition, without affecting the reactivity of the above catalyst and film-forming resin composition so as to reduce the viscosity of components, for example. Therefore, the weight ratio of the catalyst to the film-forming resin composition is not limited to the above range, and can be adjusted according to actual needs.

According to the present disclosure, the two-component curable coating composition may be prepared by simply mixing the film-forming resin composition with the catalyst in a mixing device at a predetermined weight ratio, prior to application. The mixed curable coating composition can be applied in a variety of ways that are familiar to those skilled in the art, including spraying (e.g., air assisted, airless or electrostatic spraying), brushing, rolling, flooding and dipping. In an embodiment of the present disclosure, the mixed curable coating composition is coated by spraying. The curable coating composition can be applied in various wet film thickness. In an embodiment of the present disclosure, the curable coating composition is applied in such a wet film thickness in the range of about 2 to about 260 μm, preferably in the range of about 30 to 260 μm. The applied coating may be cured by air drying at room temperature or by accelerating drying with various drying devices e.g., ovens that are familiar to those skilled in the art.

According to the present disclosure, the wood article can be prepared, for example, by the following steps: (1) providing a polished wood substrate; (2) applying the composition comprising amino and/or imino functional silane to the wood substrate with spray, to forming an adhesion promoting layer; and (3) with a wet on dry process, applying one or more Michael Addition curing coating on the adhesion promoting layer. Optionally, a colorant may be coated on the adhesion promoting layer prior to step (3), so as to provide the wood substrate with the desired color.

According to the present disclosure, the wood articles thus obtained can be used for the applications including, but not limited to: household furniture, such as tables, chairs, cabinets, and the like; bedroom and bathroom furniture; office furniture; custom furniture, such as school and children's furniture, hospitals furniture, restaurant and hotel furniture, kitchen cabinets and furniture; panels for interior design; indoor and outdoor windows and doors; indoor and outdoor window and door frames; outdoor and indoor wall panels and wooden floors.

In yet another aspect, the present disclosure discloses a method for improving adhesion of a Michael Addition curing coating to a wood substrate comprising acidic substances, comprising the step of directly applying an adhesion promoting layer on the major surface of the wood substrate wherein the adhesion promoting layer is formed by a composition comprising a functional silane comprising amino and/or imino functional groups; and wherein the Michael Addition curing coating is formed from a two-component curable coating composition comprising A) a film-forming resin composition, comprising a) a first reactive component having at least two acidic proton C—H in activated methylene or methine, b) a second component having at least two active unsaturated C═C group, and c) optionally additional additives comprising one or more selected from fillers, solvents, surface active additives, defoamers, dispersants, UV absorbers, open-time extenders, preservatives and fungicides; and B) a catalyst for catalyzing the Michael Addition reaction of the film-forming resin composition.

In still yet another aspect, the present disclosure discloses use of an adhesion promoting layer for improving adhesion of a Michael Addition curing coating to a wood substrate comprising acidic substances, wherein the adhesion promoting layer is formed by a composition comprising a functional silane comprising amino and/or imino functional groups; and wherein the Michael Addition curing coating is formed from a two-component curable coating composition comprising A) a film-forming resin composition, comprising a) a first reactive component having at least two acidic proton C—H in activated methylene or methine, b) a second component having at least two active unsaturated C=C group, and c) optionally additional additives comprising one or more selected from fillers, solvents, surface active additives, defoamers, dispersants, UV absorbers, open-time extenders, preservatives and fungicides; and B) a catalyst for catalyzing the Michael Addition reaction of the film-forming resin composition.

In one embodiment of the present disclosure, the functional silane has the structure represented by the following general formula (I)

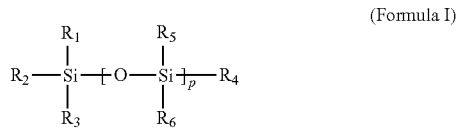

(Formula I)

in which
R$_1$, R$_2$ and R$_3$ each represents independently C$_1$-C$_6$ alkyloxy, C$_2$-C$_6$ alkenyloxy, C$_6$-C$_{10}$ aryloxy, C$_1$-C$_6$ alkanoyloxy, C$_6$-C$_{10}$ arylacyloxy, C$_1$-C$_6$ alkyl ketoximine or C$_6$-C$_{10}$ aryl ketoximine, with R$_1$, R$_2$ and R$_3$ being the same or different;
R$_4$ represents un-substituted or N-substituted amino C$_1$-C$_6$ alkyl with substituents being one or more selected from the group consisting of amino C$_1$-C$_6$ alkyl, C$_1$-C$_6$ alkyl, C$_6$-C$_{10}$ aryl, C$_7$-C$_{14}$ alkaryl and C$_7$-C$_{14}$ aralkyl;
R$_5$ and R$_6$ each represents independently C$_1$-C$_6$ alkyl, C$_6$-C$_{10}$ aryl, C$_7$-C$_{14}$ alkaryl or C$_7$-C$_{14}$ aralkyl; and
p is an integer of 0 to 4, preferably 0.

In another embodiment of the present disclosure, the functional silane may have the following structure represented by the following general formula (II)

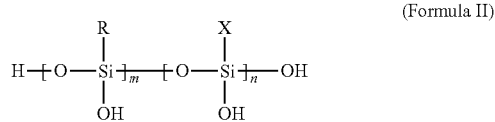

(Formula II)

in which
R represents independently, at each occurrence, optionally substituted C1-C20 alkyl, optionally substituted C6-C10 aryl, or un-substituted or N-substituted amino C$_1$-C$_6$ alkyl;
X represents independently, at each occurrence, un-substituted or N-substituted amino C$_1$-C$_6$ alkyl;
m is an integer of greater than or equal to 1 and less than 50,
n is an integer of greater than or equal to 1 and less than 50, and
the sum of m and n is an integer of greater than or equal to 2.

The above mentioned functional silane containing amino groups and/or imino groups can be applied on various wood substrates containing acidic substances to solve the problem that the Michael addition curable coating is difficult to adhere to the wood substrates. The wood articles thus treated can be used for the following applications, including, but not limited to: household furniture, such as tables, chairs, cabinets, and the like; bedroom and bathroom furniture; office furniture; custom furniture, such as school and children's furniture, hospitals furniture, restaurant and hotel furniture, kitchen cabinets and furniture; panels for interior design; indoor and outdoor windows and doors; indoor and outdoor window and door frames; outdoor and indoor wall panels and wooden floors.

The following examples describe the present disclosure in more detail, which are for illustrative purposes only, since various modifications and changes will be apparent to those skilled in the art from the scope of the present disclosure. Unless otherwise indicated, all parts, percentages, and ratios reported in the following examples are on a weight basis and all reagents used in the examples are commercially available and may be used without further treatment.

EXAMPLES

Example 1

Treatment of Wood Substrates

Solid wood boards commercial available from the timber market were dried. A sample of size 15 cm*15 cm*1.5 cm was taken from the dried board and conditioned at a temperature of 25° C. and a relative humidity (RH) of 60% with an air flow rate of 1.8 m/s to constant, where the equilibrium moisture content of the sample was 11%. A strip sander was used to polish the sample by using a sandpaper purchased from 3M$^T$ Utility Cloth Sheet 240 and then the polished sample was cleaned with a pressure gun for further use.

Formation of an Adhesion Promoting Layer

A functional silane (CAS: 919-30-2) was sprayed on the treated sample to form an adhesion promoting layer, and dried at air for 1 hour, in an oven at 70° C. for 1 hour, and at air for 7 days.

Formation of Michael Addition Curing Coating

The components of part A were mixed in the amounts shown in Table 1 below to form part A. And then Part A, Part B and an appropriate amount of diluent were mixed in the amounts shown in Table 2 below to form a two-component coating composition as a Michael addition curable coating composition.

TABLE 1

| Part A | Weight parts | | Function |
| | Clear vanish | White paint | |
| --- | --- | --- | --- |
| Acure 510-170 (85% solid content) | 597.0 | 597.0 | Malonic acid functional resin |
| Acure 550-100 (85% solid content) | 279.1 | 279.1 | Acrylic functional resin |
| Tinuvin 292 | 8.0 | 8.0 | UV absorber |
| BYK-3550 | 2.0 | 2.0 | Surfactant |
| BYK-A530 | 2.0 | 2.0 | Defoamer |
| BYK-2150 | — | 10 | Dispersant |
| TiO$_2$ | — | 250 | Pigments and fillers |

TABLE 1-continued

| Part A | Weight parts | | Function |
|---|---|---|---|
| | Clear vanish | White paint | |
| Butyl acetate | 45.5 | 45.5 | Solvent |
| isopropanol | 14.1 | 14.1 | Solvent |
| 1,2,4-trizaole solution (10% in isopropanol) | 54.3 | 54.3 | Open-time extender |
| total | 1002 | 1262 | |
| Part B: Acure 500 | | 42.3 | catalyst |

TABLE 2

| Coating composition | Solid content % | VOC (g/L) | viscosity (s) (Iwata cup NK-2@25° C.) |
|---|---|---|---|
| Clear vanish: Part A/Part B/diluent | 75 | 259 | 20.13 |
| White paint: Part A/part B/diluent | 83 | 204 | 18.56 | diluent: BAC/MAK/NBA = 40/30/30

Then, the formed coating compositions were sprayed on the wood substrate treated with the adhesion promoting layer and without the adhesion promoting layer, and then the drying time, pencil hardness, and adhesion of the resulting coating were measured, shown in Table 3.

TABLE 3

| Wood substrate | Coating thickness | Without silane treatment | | | With silane treatment | | |
|---|---|---|---|---|---|---|---|
| | | Drying time (min) | Pencil hardness | adhesion | Drying time (min) | Pencil hardness | Adhesion |
| Solid OAK | 2-3 μm | slightly sticky | Nd | Nd | slightly sticky | Nd | Nd |
| | 30 μm | 24 | F | 2B | 24 | F-H | 5B |
| | 100 μm | 24 | H | 2B | 25 | H | 5B |
| | 200 μm | 32 | H | 2B | 30 | H | 5B |
| Solid ASH | 2-3 μm | slightly sticky | Nd | Nd | slightly sticky | Nd | Nd |
| | 30 μm | 24 | F | 1B | 23 | F | 5B |
| | 100 μm | 24 | H | 1B | 25 | H | 5B |
| | 200 μm | 31 | H | 3B | 30 | H | 5B |
| Black walnut | 2-3 μm | slightly sticky | Nd | Nd | slightly sticky | Nd | Nd |
| | 30 μm | 25 | F | 2B | 23 | F | 5B |
| | 100 μm | 24 | F | 2B | 24 | F | 5B |
| | 200 μm | 34 | F | 2B | 33 | F | 5B |
| MDF | 2-3 μm | Nd | Nd | Nd | Nd | Nd | Nd |
| | 30 μm | Nd | Nd | Nd | Nd | Nd | Nd |
| | 100 μm | 20 | Nd | Nd | 21 | H | 5B |
| | 200 μm | 23 | Nd | Nd | 25 | H | 5B |

Nd means not measurable

It can be seen from the above result that the adhesion of the Michael addition curing coating to the wood substrate coated with the adhesion promoting layer formed by the functional silane exhibited significantly superior performance over the wood substrate not coated with the functional silane as an adhesion promoting layer. Specifically, the adhesion measured by a cross-hatch method according to ASTM D3359 can reach level 5B.

Example 2

In order to study the reason for the poor adhesion of the Michael addition curing coating on the wood substrate, the inventors carried out the following verification test. First, aqueous tannin solutions were formulated with concentrations of 0%, 1%, 5%, 10%, and 15%. Then, each aqueous tannin solution was sprayed on the pine wood samples, and dried in the air for 30 minutes and in a 50-50 oven for 2 hours, and then cooled.

Then, the clear varnish formulated in the above Example 1 for forming the Michael addition curing coating was coated on the treated wood with a wet film thickness of 120 microns, and dried in the air for 4 days, for further test. The test results are summarized in Table 4 below.

TABLE 4

| samples | Adhesion | Drying time (min) | Pencil hardness |
|---|---|---|---|
| Sample with 0% tannin solution | 4B | 35 | B |
| Sample with 1% tannin solution | 4B | 40 | 2B |
| Sample with 5% tannin solution | 2B | 51 | 2B |
| Sample with 10% tannin solution | 0B | 81 | 2B |
| Sample with 15% tannin solution | 0B | 90 | 2B |

From the results in Table 4 above, it can be seen that the tannin in the wood substrate will negatively affect the adhesion of the Michael addition curing coating, resulting in a significant decrease of cross-hatch adhesion and an extended drying time. Prior to the present disclosure, there is no prior art to discover that the presence of tannin in the wood substrate is the root cause for the adhesion problem of the Michael addition curing coating on the wood substrate.

Example 3

Various functional silanes were used as an adhesion promoter for performance testing.

First, different kinds of functional silanes are coated on the treated oak substrate to form an adhesion promoting layer. The treated oak substrate was dried in the air for 1 hour, dried in an oven at 50° C. for 1 hour, and polished with 600 grit sandpaper after cooling.

Then, the varnish prepared in Example 1 was coated on the treated oak substrate with a wet film thickness of 100 microns, and dried in the air for 1 hour, in an oven at 70° C. for 1 hour, and then dried in the air for 7 days. Next, a cross-hatch method was used in accordance with ASTM D3359 to measure the adhesion of the obtained sample. The results are summarized in Table 5 below.

TABLE 5

| Item | Adhesion promoter | Description | Adhesion |
|---|---|---|---|
| 1 | KH550 | Aminosilane | 5B |
| 2 | Momentive 1100 | Aminosilane | 5B |
| 3 | TEGO 2776 | Reactive functional amino modified silane | 5B |
| 4 | TEGO1151 | Aminosilane | 5B |
| 5 | TEGO2926 | Epoxy silane | 0B |

It can be seen from the results of the above table that compared with other functional silanes, amino and/or imino functional silanes specifically improve the adhesion of Michael addition curing coating to wood substrates containing acidic substances, which is difficult to anticipate in advance.

While the present disclosure has been described with respect to a number of embodiments and examples, those skilled in the art, having benefit of this invention, will appreciate that other embodiments can be devised which do not depart from the scope and spirit of the present disclosure as disclosed herein.

What is claimed is:

1. A wood article comprising
a wood substrate comprising acidic substances and having at least one major surface;
an adhesion promoting layer directly applied on the major surface of the wood substrate; and
a Michael Addition curing coating applied on the adhesion promoting layer,
wherein the adhesion promoting layer is formed by a composition comprising a functional silane comprising amino and/or imino functional groups; and
wherein the Michael Addition curing coating is formed from a two-component curable coating composition.

2. The wood article as claimed in claim 1, wherein the functional silane has the structure represented by the following general formula (I)

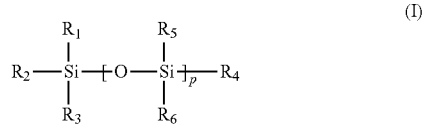

wherein,
$R_1$, $R_2$, and $R_3$ each represents independently $C_1$-$C_6$ alkyloxy, $C_2$-$C_6$ alkenyloxy, $C_6$-$C_{10}$ aryloxy, $C_1$-$C_6$ alkanoyloxy, $C_6$-$C_{10}$ arylacyloxy, $C_1$-$C_6$ alkyl ketoximine or $C_6$-$C_{10}$ aryl ketoximine, with $R_1$, $R_2$, and $R_3$ being the same or different;
$R_4$ represents un-substituted or N-substituted amino $C_1$-$C_6$ alkyl with substituents being selected from one or more of amino $C_1$-$C_6$ alkyl, $C_6$-$C_{10}$ aryl, $C_7$-$C_{14}$ alkaryl or $C_7$-$C_{14}$ aralkyl;
$R_5$ and $R_6$ each represents independently $C_1$-$C_6$ alkyl, $C_6$-$C_{10}$ aryl, $C_7$-$C_{14}$ alkaryl or $C_7$-$C_{14}$ aralkyl; and
p is an integer of 0 to 4.

3. The wood article as claimed in claim 1, wherein the functional silane comprises one or more selected from amino C1-C6 alkyl trimethoxy silane, amino C1-C6 alkyl triethoxy silane, amino C1-C6 alkyl tripropoxy silane, amino C1-C6 alkyl tributyloxy silane, amino C1-C6 alkyl triisopropenyloxy silane, amino C1-C6 alkyl tributyl ketoximine silane, N-(amino C1-C6 alkyl)-amino C1-C6 alkyl trimethoxy silane, N-(amino C1-C6 alkyl)-amino C1-C6 alkyl triethoxy silane, N-(amino C1-C6 alkyl)-amino C1-C6 alkyl tripropoxy silane, N-(amino C1-C6 alkyl)-amino C1-C6 alkyl tributyloxy silane, N-(amino C1-C6 alkyl)-amino C1-C6 alkyl triisopropenyloxy silane, and N-(amino C1-C6 alkyl)-amino C1-C6 alkyl tributyl ketoximine silane.

4. The wood article as claimed in claim 1, wherein the functional silane further comprises one or more silanol groups chemically bonded to the molecular backbone of the functional silane.

5. The wood article as claimed in claim 1, wherein the functional silane has the structure represented by the following general formula (II)

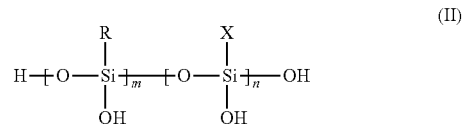

in which
R represents independently, at each occurrence, optionally substituted C1-C20 alkyl, optionally substituted C6-C10 aryl, or un-substituted or N-substituted amino $C_1$-$C_6$ alkyl;
X represents independently, at each occurrence, un-substituted or N-substituted amino $C_1$-$C_6$ alkyl;
m is an integer of greater than or equal to 1 and less than 50,
n is an integer of greater than or equal to 1 and less than 50, and
the sum of m and n is an integer of greater than or equal to 2.

6. The wood article as claimed in claim 5, wherein R represents independently at each occurrence methyl, ethyl, propyl, butyl, pentyl, hexyl, heptyl, octyl, nonyl, decyl, undecyl, dodecyl, tridecyl, tetradecyl, pentadecyl, hexadecyl, octadecyl, eicosyl, amino $C_1$-$C_6$ alkyl or N-(amino $C_1$-$C_6$ alkyl)-amino $C_1$-$C_6$ alkyl.

7. The wood article as claimed in claim 5, wherein the X represents independently at each occurrence amino $C_1$-$C_6$ alkyl or N-(amino $C_1$-$C_6$ alkyl)-amino $C_1$-$C_6$ alkyl.

8. The wood article as claimed in claim 1, wherein the functional silane comprises a mixture of siloxane molecules of Structure II, and the mixture has a ratio of m to n ranging from 0.8:1 to 1.2:1.

9. The wood article as claimed in claim 1, wherein the composition comprising functional silane is a system of the functional silane in an organic solvent or an aqueous dispersion of the functional silane.

10. The wood article as claimed in claim 9, wherein the aqueous dispersion has a pH of 10 or more at 20° C.

11. The wood article as claimed in claim 9, wherein the aqueous dispersion has a viscosity of 5 mPa·s or less at 20° C.

12. The wood article as claimed in claim 1, wherein the acidic substances comprise tannin, and the wood substrate has a tannin content of at least 0.1 wt %.

13. The wood article as claimed in claim 1, wherein the wood substrate is selected from one or more of hardwood, chestnut, *eucalyptus*, red chestnut, *camellia, eucalyptus*, Douglas fir, Japanese cedar, American cypress, Japanese red pine, Japanese cypress, water walnut, black walnut, maple, Japan beech, Japanese *paulownia*, birch, *Borneo, magnolia*, ash, teak, *Xylosma japonicum, Catalpa* wood, *Dryobalanops* spp., fir, oak and rubber wood.

14. The wood article as claimed in claim 1, wherein the two-component curable coating composition comprises:

A) a film-forming resin composition, comprising a) a first reactive component having at least two acidic proton C—H in activated methylene or methine, b) a second component having at least two active unsaturated C=C group, and c) optionally additional additives comprising one or more selected from fillers, solvents, surface active additives, defoamers, dispersants, UV absorbers, open-time extenders, preservatives and fungicides; and B) a catalyst for catalyzing the Michael Addition reaction of the film-forming resin composition.

15. The wood article as claimed in claim 14, wherein the weight ratio of the film-forming resin composition to the catalyst is in the range of from 100:2 to 100:8.

16. The wood article as claimed in claim 1, wherein the Michael Addition curing coating has a thickness of 30 μm or.

17. The wood article as claimed in claim 1, which has an adhesion of 5B or more, as measured with a cross-hatch method according to ASTM D3359.

18. A process for preparing the wood article as claimed in claim 1, comprising (a) providing a wood substrate comprising acidic substances and having at least one major surface;

(b) directly applying the composition comprising functional silane on the major surface of the wood substrate to form an adhesion promoting layer; and (c) applying the two-component curable coating composition on the adhesion promoting layer, to form a Michael Addition curing coating.

* * * * *